UNITED STATES PATENT OFFICE.

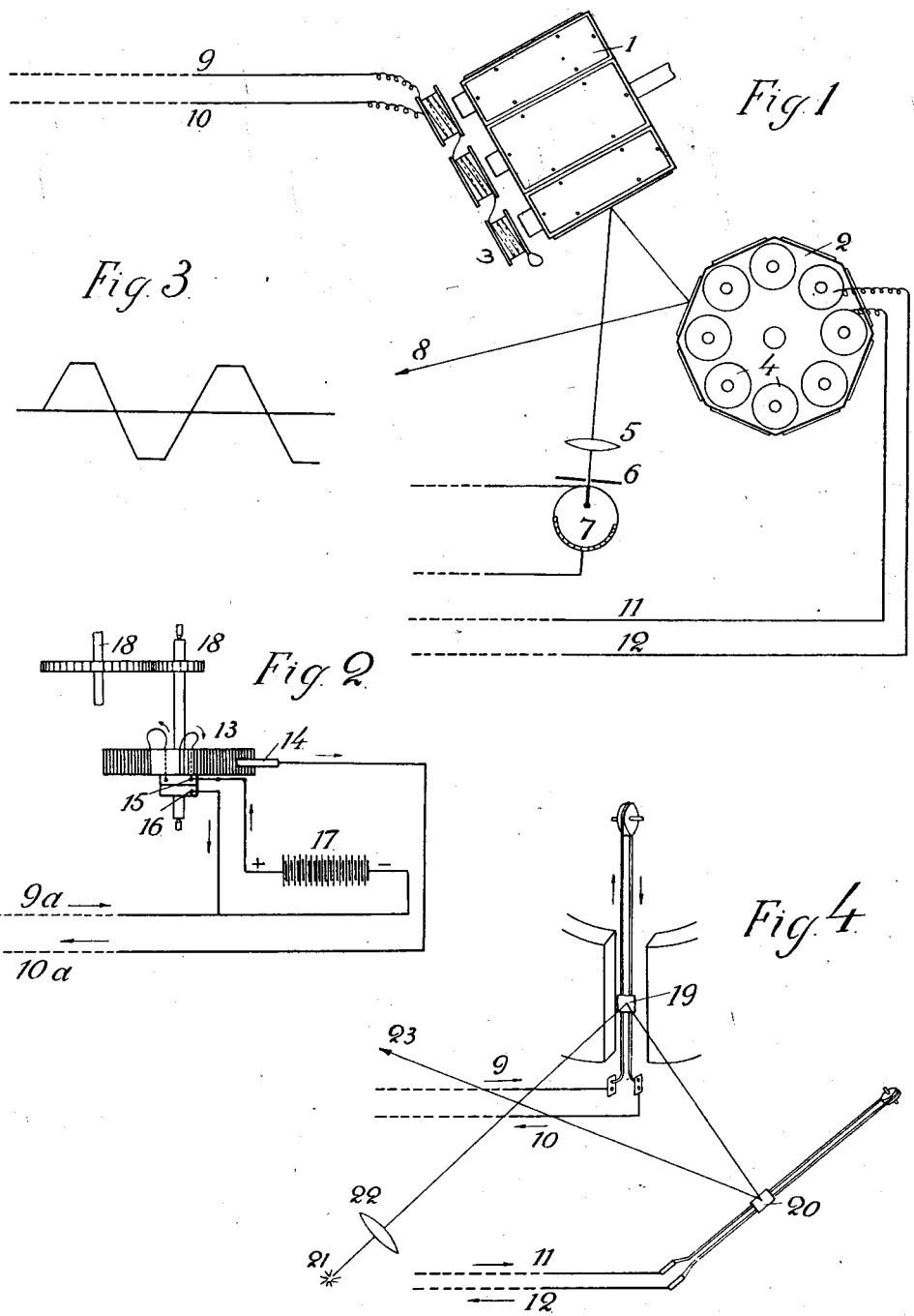

BORIS ROSING, OF ST. PETERSBURG, RUSSIA.

ELECTRICAL TELESCOPY.

1,135,624.  Specification of Letters Patent.  Patented Apr. 13, 1915.

Application filed April 5, 1911. Serial No. 619,165.

*To all whom it may concern:*

Be it known that I, BORIS ROSING, a citizen of the Russian Empire, residing at St. Petersburg, in the Russian Empire, have invented certain new and useful Improvements in Electrical Telescopy; and I do hereby declare the following to be a full, clear, and exact description of the invention such as will enable others skilled in the art to which it appertains to make and use the same.

In electrical telescopic and like apparatus in which the field of the picture is transmitted to a distance point by point by means of a photoelectric apparatus at the transmitting station and is in like manner reproduced by means of suitable apparatus at the receiving station, it is absolutely necessary to provide in addition to the transmitting and receiving devices, a further device serving to maintain synchronism and proportion between the movement of the aperture of the photoelectric receiver relative to the field of view of the transmitting station and the motion of the luminous signaling point, relative to the field of view of the observer, produced by the apparatus at the receiving station. In heretofore proposed electrotelescopic apparatus it is generally attempted to obtain this synchronization of the movement by providing identical mechanisms at both stations, such mechanisms being driven either from a common source of power, or from different sources of power but in either case in such a way that the mechanisms move at the same rate, correcting apparatus being arranged at one station in order to secure as exact synchronisms as possible. It has however been found impracticable to obtain the necessary synchronism in this way in view of the enormously high speeds of the mechanisms which have to be dealt with. It could be theoretically proved that it is impossible to avoid the production of distorted or impermissibly deformed reproductions at the receiving station unless one of these two mechanisms is incapable of running ahead of the other by more than 0.001 per cent; a condition which, at the extraordinarily great speed of working cannot for the present be regarded as capable of realization.

According to the present invention perfect synchronism of the movements in question is obtained by the use at the receiving station of a mechanism which is both directly and completely subordinated to the corresponding mechanism at the transmitting station in such a way that it follows without appreciable resistance or sluggishness and retardation the movements of the controlling mechanism, that is to say positively work in synchronism therewith. Such a mechanism may, broadly, be of any desired kind, subject to the condition that it must not be an apparatus of the same kind as and equal in strength to the mechanism at the transmitting station, because such an apparatus would not, as above indicated, be sufficiently obedient to the controller and would not follow the variations in the movement thereof with the absolute accuracy which under the circumstances is indispensable.

The transmitting station equipment of a single photoelectric telescopic apparatus, whatever may be its construction in other respects, comprises as an absolutely indispensable constituent thereof an optical system that serves to direct the rays of light proceeding from the different points of the field of the picture in a predetermined order onto the aperture of the screen of a photoelectric receiver. For this purpose the axis of the optical system, which always passes through this aperture, must be so deflected and consequently moved in space as to cut the field of the picture successively in all points. In order to transmit a picture of two dimensions the aforesaid optical axis must execute two mutually independent component movements along any pair of coordinate axes whatever. If the optical axis executes one of these component movements at a greater speed than the other, the resultant movement will follow a corresponding zig-zag or spirally shaped path so that the axis will gradually traverse the entire field of the picture. In order that there may simultaneously be re-produced at the receiving station a correct reproduction of the field of the picture, the luminous point transmitted from the photo-electric receiver, or its real or virtual image must have imparted to it in the field of view of the observer, a movement which is exactly equal to or proportionate to the movement of the said optical axis and is absolutely synchronous therewith.

To this end the applicant proposes, to employ at the receiving station, as the apparatus directly acted upon by the corresponding mechanism at the transmitting station and subordinated thereto, a system comprising two oscillographs with movable reflecting surfaces. These oscillographs are so arranged in relation to each other and to the luminous point produced at the receiving station, that the rays of light successively thrown off from the latter are received upon a screen or by the eye of the observer. When the mirrors of these oscillographs rotate, each about its own axis, the axis of this optical system, and consequently therefore the reflected pencil of rays also, has imparted to it two mutually independent component movements with respect to a pair of coordinate axes, which if the axes of rotation of the mirrors be suitably arranged, correspond to the component movements of the optical axis at the transmitting station, with respect to its coördinate axes. In order to render these movements of the oscillograph mirrors and the corresponding component movements of the axis of the optical system at the transmitting station synchronous, this system is so constructed in the well known way that, corresponding to the component movements of the optical axis at the transmitting station, there are simultaneously produced synchronously pulsating or alternating currents one of the oscillographs at the receiving station being placed in the circuit of each of these currents.

For further explanation of the invention reference is directed to the accompanying illustrative drawings in which constructional forms of the parts in question of the transmitting and receiving station are diagrammatically represented by way of example.

Figure 1 illustrates the optical system employed at the transmitting station, Fig. 2 illustrates an alternative construction of such system, Fig. 3 illustrates the current curve corresponding to a component movement of the optical axis, and Fig. 4 illustrates the optical system employed at the receiving station.

The optical system at the transmitting station comprises two polyhedral rotary mirrors 1 and 2, see Fig. 1, the axes of rotation of which are at right angles to each other and are driven at such speeds that the angular velocity of one of the mirrors is several times greater than that of the other; and an objective or lens 5, the focal plane of which coincides with the plane of the screen 6 of a photoelectric receiver 7 arranged directly behind it. This objective 5 is arranged in such a manner that rays emitted from any point of the field of vision arrive in the photo-electric receiver only after successive reflections by the two mirrors. The said receiver in combination with the two polyhedral mirrors forms a unitary optical system. When the mirrors 1 and 2 are rotated the end 8 of the optical axis, thus deflected, will traverse the field of the picture in a zig-zag path so that from every portion thereof light is transmitted in a determinate order through the aperture of the screen 6 upon the photo electric receiver 7. Permanent or electromagnets carried by the mirrors 1 and 2 and stationary bobbins 3, together forming small generators producing in the corresponding bobbins pulsating currents the periodicity of which per revolution of the mirrors corresponds to the number of the reflecting surfaces thereof. The current curve may be of any suitable form, provided it has ascending and descending sections in each phase, during which the variations in the strength of the current are proportional to the angle of rotation of the electromagnets or, what comes to the same thing, of the corresponding mirror surface. Fig. 3 shows a current curve corresponding to these conditions and such curve can always be accurately maintained without difficulty by a suitable arrangement of magnets and bobbins. In addition to this the bobbins must be so distributed around the axes of rotation of the mirrors that the segments of the current curve correspond with those periods of time during which the optical axis 8 cuts the field of the picture to be transmitted. This is easily accomplished since as is well known, the current varies with the relative movement between the armature and the electromagnet poles and at each given instant of time has a certain value dependent upon the position of the armature with relation to the exciting coil. If at any time this desired condition is not fulfilled, it is only necessary, in order to produce the desired result, to adjust the system of coils 3 and 4 by turning them about the axes of the corresponding mirrors that with a determined position of the mirrors and also an accurately determined course of the optical axis of the system, the current generated at any given moment corresponds to a determined point of the current curve (Fig. 3), which the alteration of the same with the time makes clear.

These preliminary conditions being satisfied, the currents which are produced in the conductors 9, 10 and 11, 12 and transmitted to the receiving station are proportional to the components in the directions of the axes of a corresponding system of coördinates of angular movements which the optical axis 8 executes in the field of view. Corresponding to this arrangement at the transmitting station the optical system at the receiving station comprises two oscillograph mirrors 19 and 20, the axes of which are arranged to correspond to the axes of rotation of the mirrors 1 and 2, and an objective or lens 22, which directs the rays proceeding from the luminous signaling point 21 on to the small mirror 19. If in this case the oscillographs be included in the conductors 9, 10 and 11, 12 respectively of the bobbin windings 3 and 4 of the transmitting station, the mirrors 19 and 20 will be synchronously moved in relation to the surface of the multiple mirrors 1 and 2 and there will therefore be imparted to the deflected optical axis 23 at the receiving station the same movements in space which the deflected optical axis 8 executes at the transmitting station. Now as the angles of rotation of the mirrors 19 and 20 of the oscillographs are strictly proportional to the current strengths flowing through them, while the said currents as explained hereinbefore vary with the angular movements of the corresponding mirror systems 1 and 2. Therefore the said angular movements of the mirrors 19 and 20 of the oscillographs are proportional to the angular movements of the mirrors 1 and 2 and therefore the angular displacements of the two optical axes 8 and 23 are also strictly proportion to each other and vary synchronously.

It is to be noted that the oscillographs are essentially different structurally from the axis moving means at the transmitting end, that is, from the revolving mirror sets; the most important difference being that the moving parts of the oscillographs have much less inertia than do said revolving mirror sets. Relatively speaking, the inertia of the oscillograph mirrors is substantially negligible, thus enabling the attainment of practically perfect synchronism in the movements of the corresponding parts at both ends of the system.

Ordinary rheostats, see Fig. 2, included in the circuit of a source of continuous electric current may also be employed for the production of the pulsating electric currents. Thus for example for this purpose the winding of a rheostat can be arranged upon a ring 13 upon which bears a brush 14. The current from the battery 17 passes into the rheostat winding by means of slip rings and brushes 15 and 16. The current collected by the brush 14 flows at the receiving station into the corresponding oscillograph. A return wire 9ª is connected directly to the other pole of the battery 17. To obtain in this circuit currents, the intensity of which varies synchronously with the movements of the surfaces of the corresponding polyhedral mirror the axes of the ring 13 and of the corresponding mirror are connected by intermediate gearing 18 which is such that a complete rotation of the ring 13 corresponds to a partial rotation of the mirror to the extent of about one mirror face thereof.

It will be understood that the apparatus hereinbefore described provides means by which the optical axis from a suitable source of light at the receiving end is made to travel over a field or screen in synchronism with the travel of a corresponding optical axis at the transmitting end which axis is moved over the field or picture to be transmitted. By now varying the light from the source of light at the receiving end, the picture is reproduced in the required manner. This variation in the light which travels along the optical axis at the receiving end is accomplished in any usual way, as, for example, by the use of a selenium cell at the transmitting end which is affected by the light impressed upon it and in turn causes corresponding variations of current in a circuit of its own, which variations of current produce corresponding variations in the amount of light allowed to travel along the shifting optical axis at the receiving end.

As the means for causing these changes in strength of illumination along the optical axis at the receiving end constitute no part of the present invention claimed herein it is thought no detail description of such means need be given in the present application.

What I claim is:

1. In an apparatus of the class described, the combination, with revolving sets of mirrors, one set arranged to reflect rays to the other set, of electric generators arranged to be moved simultaneously with the corresponding sets of mirrors, oscillographs at the receiving end provided with mirrors, one arranged to reflect rays to the other, and circuits including the corresponding electric generators and the oscillographs.

2. In an apparatus of the class described, the combination, with revolving sets of mirrors at the transmitting end, one set being arranged to reflect rays to another set, of oscillographs at the receiving end provided with mirrors, one mirror being arranged to reflect rays to another, and suitable energizing circuits operatively connecting the revolving sets of mirrors with the oscillographs in pairs.

3. In an apparatus of the class described, the combination, with revolving mirrors, one set being arranged to reflect rays to another set of oscillographs at the receiving end provided with mirrors arranged to reflect rays one to another, circuits operatively connecting corresponding sets of mirrors and the oscillographs, and means for supplying current to said circuits to operate the connected sets of mirrors and oscillographs in synchronism.

In testimony whereof I hereunto affix my signature in the presence of two witnesses.

BORIS ROSING.

Witnesses:
 WILLIAM AEININGER,
 H. A. LOVIAGUINE.